Patented May 29, 1945

2,377,231

UNITED STATES PATENT OFFICE 2,377,231

PLASTIC COMPOSITION

Ralph F. Hayes, North Wilbraham, Mass., assignor to Monsanto Chemical Company, St. Louis, Mo., a corporation of Delaware No Drawing. Application May 16, 1940,
Serial No. 335,457

28 Claims. (Cl. 18—55)

This invention relates to plastic compositions comprising polystyrene and vinyl resins relatively immiscible therewith.

It is well-known that certain compositions comprising synthetic resins and/or other high molecular weight substances lend themselves readily to the manufacture of articles possessing a highly decorative appearance. It has been found that a number of the color effects available in certain natural materials, which are exceptionally pleasing to the eye, are also desirable in said manufactured products. Among said color effects, there are two, more or less related and particularly desirable color effects, which are to be found in natural pearls and opals. Unfortunately, the colors of pearls and opals have tended to be extremely difficult and expensive to reproduce. Generally, special materials and processes have been required to impart these decorative effects to the plastic compositions of industry.

One object of this invention is to provide new compositions of matter comprising polystyrene and vinyl resins relatively immiscible therewith. Another object is to provide decorative articles comprising polystyrene and vinyl resins relatively immiscible therewith. A further object of this invention is to provide compositions comprising polystyrene and vinyl resins relatively immiscible therewith, said compositions possessing a lustrous, nacreous appearance resembling, for example, natural pearls and opals.

It is well-known to those skilled in the art that the addition, for example, of suitable fish scale material to cellulose ester compositions, imparts to said compositions an appearance simulating that of natural pearls. However, this fish scale material is very expensive and special processing conditions are required to produce compositions possessing said pearly appearance. For example, nacreous articles comprising polystyrene have been found difficult to produce by incorporating fish scale material therein.

However, by the process of the present invention, it has been found possible, without the necessity of special processing methods, to prepare decorative articles comprising polystyrene and possessing a decidedly attractive, nacreous and/or opalescent appearance. These highly valuable and unexpected results have been accomplished by incorporating certain vinyl resins in polystyrene.

The vinyl resins that produce these decorative effects when incorporated in polystyrene are characterized by relative immiscibility therewith. Illustrative of the vinyl resins that can be employed by this invention are polyvinyl acetals, as for example, the partial polyvinyl formaldehyde acetals, the partial polyvinyl acetaldehyde acetals and the partial polyvinylbutyraldehyde acetals; polyvinyl esters of lower aliphatic organic acids, as for example, polyvinyl acetate; the copolymers of vinyl esters of lower aliphatic organic acids and vinyl halides, as for example, the copolymers of vinyl acetate and vinyl chloride.

The vinyl resins are incorporated in the polystyrene by any suitable means but, preferably, by means of hot milling rolls under suitable milling conditions. A mixing period of substantially 20 minutes at a roll temperature of substantially 170° F. to 320° F. has been found suitable. The two resin components can be mixed in all proportions and still produce articles possessing the previously described decorative appearance. However, in order to impart to the article a strongly nacreous appearance, it is generally necessary that neither component be present in excess of substantially 90% by weight of the sum of the weights of the two components. Nevertheless, even when one component is present in excess of substantially 90% by weight of the sum of the weights of the two components, the products are still very attractive and those containing as little as 0.4 part by weight of one component for every 100 parts by weight of the other component have been found to be beautifully opalescent.

Particularly effective compositions are those produced by incorporating partial polyvinyl acetal resins in polystyrene as illustrated by the following specific examples, the parts being by weight.

*Example 1*

Polyvinyl acetate, of such a degree of polymerization that a one-molar benzene solution possessed a viscosity of substantially 25 centipoises at 20° C., was hydrolyzed and the polyvinyl alcohol so formed was acetalized with butyraldehyde by one of the well-known processes. 20 parts of the partial polyvinyl butyraldehyde acetal prepared in this manner and containing substantially 17% to 21% hydroxyl groups calculated as polyvinyl alcohol, 3% or less acetate by weight and the balance acetal, were incorporated in 100 parts of polystyrene, of such a degree of polymerization that a 10% toluol solution of said polystyrene possessed a viscosity of substantially 50 centipoises at 25° C. After milling for substantially 20 minutes on the mixing rolls at a roll temperature of substantially 190° F., the product was then suitably comminuted and molded by an injection molding process. An exceedingly striking, lustrous, nacreous appearance was imparted to the molded product.

Example 2

Polyvinyl acetate, of such a degree of polymerization that a one-molar benzene solution possessed a viscosity of substantially 7 centipoises at 20° C., was hydrolyzed and the polyvinyl alcohol so formed was acetalized with formaldehyde by one of the well-known processes. 20 parts of the partial polyvinyl formaldehyde acetal prepared in this manner and containing substantially 4.5% to 8.5% hydroxyl groups calculated as polyvinyl alcohol, 14% to 18% acetate by weight and the balance acetal, were incorporated in 100 parts of polystyrene of such a degree of polymerization that a 10% toluol solution of said polystyrene possessed a viscosity of substantially 200 centipoises at 25° C.

The method of incorporating the partial polyvinyl formaldehyde acetal in the polystyrene in this example was similar to that employed in Example 1 for the partial polyvinyl butyraldehyde acetal and the product obtained possessed a similar appearance.

Example 3

20 parts of a partial polyvinyl acetaldehyde acetal, prepared in a manner similar to that employed in the preparation of the partial polyvinyl acetals employed in Examples 1 and 2, were incorporated in 100 parts of polystyrene similar to that employed in Example 2.

The method of incorporating the partial polyvinyl acetaldehyde acetal in the polystyrene was similar to that employed in Example 1 for the partial polyvinyl butyraldehyde acetal and the product obtained possessed a similar appearance.

Example 4

50 parts of a partial polyvinyl butyraldehyde acetal, similar to that employed in Example 1, were incorporated in 50 parts of polystyrene similar to that employed in Example 2. The method of incorporating the partial polyvinyl butyraldehyde acetal in the polystyrene was similar to that employed in Example 1 and the product possessed a similar appearance.

Example 5

100 parts of a partial polyvinyl butyraldehyde acetal, similar to that employed in Example 1, were incorporated in 20 parts of polystyrene similar to that employed in Example 2. The method of incorporating the partial polyvinyl butyraldehyde acetal in the polystyrene was similar to that employed in Example 1 and the product possessed a similar appearance.

The hereinbefore described specific examples of this invention have all illustrated the preparation of articles possessing a nacreous appearance by incorporating certain partial polyvinyl acetal resins in polystyrene. However, the scope of the present invention is not limited to these particular polyvinyl acetal resins. The polyvinyl acetals and the method of preparing the same may be widely varied. Thus, for example, other vinyl esters may be substituted for vinyl acetate and the degree of polymerization of said vinyl esters employed in the preparation of the polyvinyl acetals may be widely varied; other acetalizing substances, as for example, propionaldehyde, valeraldehyde, hexaldehyde, heptaldehyde and the like, singly and in admixture, as well as ketones, such as cyclohexanone, may be substituted for the aldehydes employed in preparing the polyvinyl acetals previously described; the content of the polyvinyl acetal may be widely varied as regards hydroxyl, ester and acetal groups. Furthermore, either the polyvinyl acetal resins per se or the compositions resulting from the incorporation of one or more plasticizers in the acetals may be employed by this invention in preparing these decorative articles. Thus, such plasticizers as dibutyl phthalate, butyl laurate and many others well-known to those skilled in the art, may be incorporated in the polyvinyl acetals. Furthermore, the present invention is not limited to the use of polyvinyl acetal resins, as has previously been stated, and other vinyl resins of various types characterized by relative immiscibility in polystyrene have been employed.

In addition to the above described variations, there are many others that fall within the scope of the present invention. Thus, the degree of polymerization of the polystyrene, as indicated by viscosity or other means, is not limited to the polystyrenes employed in the specific examples and may be widely varied. Other methods of incorporating the previously described vinyl resins in polystyrene may be employed and, furthermore, the new products of this invention are not limited to compositions comprising polystyrene and one vinyl resin relatively immiscible therewith but, if desired, a plurality of said vinyl resins may be incorporated in polystyrene to form decorative articles. The mixtures of the two types of resins do not have to be molded to bring out the pearly appearance; thus, calendering and other finishing processes may be employed. Dyes, pigments, fillers and other modifiers may be added as desired.

The present invention is limited solely by the claims attached hereto.

What is claimed:

1. A nacreous composition of a matter comprising polystyrene and a partial polyvinyl acetal resin relatively immiscible with said polystyrene in said composition and physically intermixed with said polystyrene while in a heat-softened condition to give a nacreous appearance to said composition.

2. A new composition of matter comprising a mechanical mixture of polystyrene and a partial polyvinyl acetal resin relatively immiscible with said polystyrene in said composition, said acetal resin having been made from a lower aliphatic aldehyde and physically intermixed with said polystyrene while in a heat-softened condition to give a nacreous appearance to said composition.

3. A new composition of matter comprising polystyrene and a partial polyvinyl acetal resin relatively immiscible with said polystyrene in said composition, wherein neither component of said composition is present in excess of substantially 90 per cent by weight of the sum of the weights of the two components, said polystyrene and said acetal resin being physically intermixed while in a heat-softened condition to give a nacreous appearance to said composition.

4. A nacreous composition of matter comprising polystyrene and a polyvinyl ester of a lower aliphatic organic acid relatively immiscible therewith in said composition and physically intermixed with said polystyrene while in a heat-softened condition to give a nacreous appearance to said composition.

5. A new composition of matter comprising polystyrene and a co-polymer of a vinyl halide and a vinyl ester of a lower aliphatic organic acid, said copolymer being relatively immiscible with said polystyrene in said composition and physically intermixed with said polystyrene while in a heat-softened condition to give a nacreous appearance to said composition.

6. A new composition of matter comprising polystyrene and a partial polyvinyl formaldehyde acetal resin relatively immiscible with said polystyrene in said composition and physically intermixed with said polystyrene while in a heat-softened condition to give a nacreous appearance to said composition.

7. A new composition of matter comprising polystyrene and a partial polyvinyl acetaldehyde acetal resin relatively immiscible with said polystyrene in said composition and physically intermixed with said polystyrene while in a heat-softened condition to give a nacreous appearance to said composition.

8. A new composition of matter comprising polystyrene and a partial polyvinyl butyraldehyde acetal resin relatively immiscible with said polystyrene in said composition and physically intermixed with said polystyrene while in a heat-softened condition to give a nacreous appearance to said composition.

9. A nacreous composition of matter comprising polystyrene and a partial polyvinyl formaldehyde acetal resin relatively immiscible with said polystyrene in said composition, said acetal resin containing substantially 4.5 per cent to 8.5 per cent hydroxyl groups calculated as polyvinyl alcohol, 14 per cent to 18 per cent acetate by weight and the balance acetal and physically intermixed with said polystyrene while in a heat-softened condition to give a nacreous appearance to said composition.

10. A nacreous composition of matter comprising polystyrene and a partial polyvinyl butyraldehyde acetal resin relatively immiscible with said polystyrene in said composition, said acetal resin containing substantially 17 per cent to 21 per cent hydroxyl groups calculated as polyvinyl alcohol, 3 per cent or less acetate by weight, and the balance acetal and physically intermixed with said polystyrene while in a heat-softened condition to give a nacreous appearance to said composition.

11. The process of preparing a new composition of matter which comprises mechanically mixing while in a heat-softened condition polystyrene and a partial polyvinyl butyraldehyde acetal resin immiscible with said polystyrene in the resulting composition.

12. The process of imparting a nacreous appearance to polystyrene which comprises mechanically mixing therewith a partial polyvinyl butyraldehyde acetal resin while in a heat-softened condition, said acetal resin containing substantially 17 per cent to 21 per cent hydroxyl groups calculated as polyvinyl alcohol, 3 per cent or less acetate by weight and the balance acetal and being immiscible with said polystyrene in the resulting composition.

13. The process of imparting a nacreous appearance to polystyrene which comprises incorporating therein a partial polyvinyl formaldehyde acetal resin while in a heat-softened condition, said acetal resin containing substantially 4.5 per cent to 8.5 per cent hydroxyl groups calculated as polyvinyl alcohol, 14 per cent to 18 per cent acetate by weight and the balance acetal and being immiscible with said polystyrene in the resulting composition.

14. A new composition of matter having an opalescent appearance comprising polystyrene and a vinyl resin characterized by containing C—O—C groups and by incompatibility with said polystyrene in said composition, physically intermixed with said polystyrene while in a heat-softened condition to give an opalescent appearance to said composition.

15. A decorative article having an opalescent appearance comprising polystyrene and a vinyl resin characterized by containing C—O—C groups and by incompatibility with said polystyrene in said article, physically intermixed with said polystyrene while in a heat softened condition to give an opalescent appearance to said article.

16. A nacreous composition of matter comprising polystyrene and a vinyl resin characterized by containing C—O—C groups and by being incompatible with said polystyrene in said composition, physically intermixed with said polystyrene while in a heat-softened condition to give a nacreous appearance to said composition.

17. The process of preparing a decorative article having an opalescent appearance which comprises heat softening and incorporating in polystyrene, while in a heat-softened condition a vinyl resin characterized by containing C—O—C groups and by incompatibility with said polystyrene in said article, comminuting the resulting mixture and injection molding said article therefrom.

18. The process of preparing a decorative article having a nacreous appearance which comprises mechanically mixing an incompatible mixture of polystyrene and a vinyl resin characterized by containing C—O—C groups and by being relatively immiscible with said polystyrene in the resulting composition, and injection molding said article therefrom while in a heat-softened condition.

19. The process of preparing a decorative article which comprises hot milling an incompatible mechanical mixture of polystyrene and a polyvinyl acetal resin incompatible therewith in the resulting composition, and injection molding said article therefrom while in a heat-softened condition.

20. The process of preparing a decorative article which comprises heat softening and incorporating in polystyrene while in a heat-softened condition a partial polyvinyl acetal resin made from a lower aliphatic aldehyde and being incompatible with said polystyrene in the resulting composition, and injection molding said article therefrom.

21. The process of preparing a decorative article which comprises heat softening and incorporating in polystyrene while in a heat softened condition a partial polyvinyl formaldehyde acetal resin incompatible with said polystyrene in the resulting composition, and injection molding said decorative article therefrom.

22. Process of making a mixture of polystyrene and polyvinyl acetal resin having an opalescent appearance which comprises milling said polystyrene and said polyvinyl acetal resin while in a heat-softened condition on mixing rolls to form an opalescent appearing mixture thereof in which said polyvinyl acetal resin is immiscible with said polystyrene.

23. An opalescent appearing mixture of polystyrene and polyvinyl acetal resin consisting essentially of polystyrene and a polyvinyl acetal resin immiscible therewith in the resulting composition and physically intermixed with said polystyrene while in a heat-softened condition.

24. A molded product having an opalescent appearance comprising a pressure molded incompatible mechanical mixture of a polystyrene and a vinyl resin characterized by containing C—O—C groups and by being incompatible with said polystyrene in said molded mixture, said mixture being molded while in a heat-softened condition to give an opalescent appearance to said molded product.

25. A pressure molded product having an opalescent appearance comprising a pressure molded incompatible mechanical mixture of a polystyrene and a polyvinyl acetal resin which is incompatible with said polystyrene in said molded mixture, said mixture being molded while in a heat-softened condition to give an opalescent appearance to said molded product.

26. A molded product having an opalescent appearance comprising an injection molded incompatible mechanical mixture of a polystyrene and a vinyl resin characterized by containing C—O—C groups and by being incompatible with said polystyrene in said molded mixture, said mixture being molded while in a heat-softened condition to give an opalescent appearance to said molded product.

27. A molded product having an opalescent appearance comprising an injection molded incompatible mechanical mixture of a polystyrene and a polyvinyl acetal resin which is incompatible with said polystyrene in said molded mixture, said mixture being molded while in a heat-softened condition to give an opalescent appearance to said molded product.

28. A molded product having an opalescent appearance comprising an injection molded incompatible mechanical mixture of a polystyrene and a partial polyvinyl butyraldehyde acetal resin which is incompatible with said polystyrene in said molded mixture, said mixture being molded while in a heat-softened condition to give an opalescent appearance to said molded product.

RALPH F. HAYES.